Figure 1:
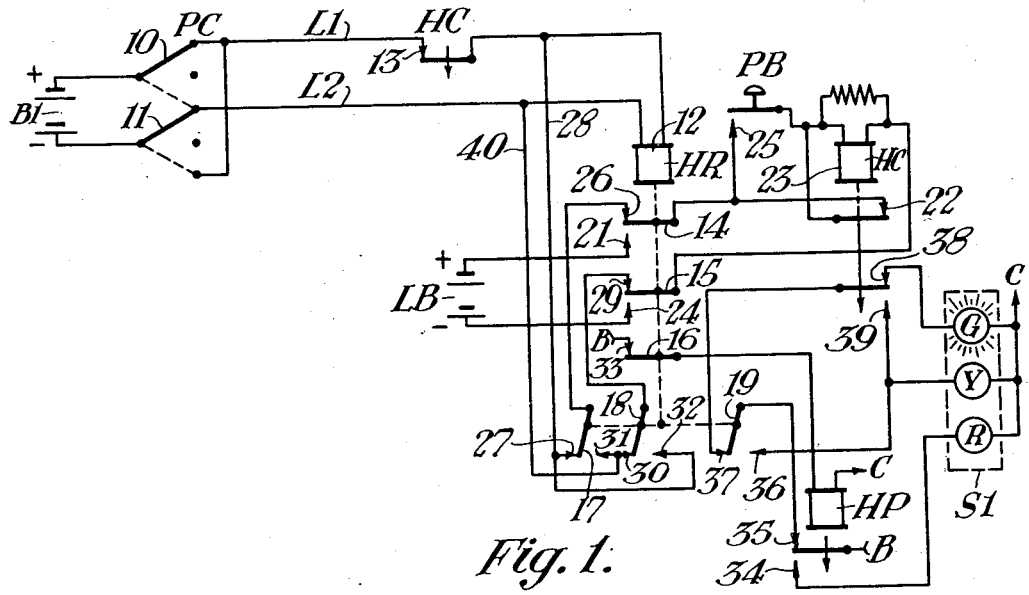

Feb. 17, 1948.  A. E. DODD  2,436,293
ELECTRICAL CONTROL APPARATUS
Filed July 16, 1945  3 Sheets-Sheet 1

INVENTOR.
Arthur E. Dodd.
BY
HIS ATTORNEY

Patented Feb. 17, 1948

2,436,293

UNITED STATES PATENT OFFICE 2,436,293

ELECTRICAL CONTROL APPARATUS

Arthur E. Dodd, Edgewood, Pa., assignor to The Union Switch & Signal Company, Swissvale, Pa., a corporation of Pennsylvania Application July 16, 1945, Serial No. 605,400

12 Claims. (Cl. 177—353)

My invention relates to electrical control apparatus, and more particularly to apparatus to effect either a first or a second control function according as a control circuit is supplied with current of positive or negative polarity.

Control apparatus of the type here involved ordinarily includes a polar neutral relay and with this type of relay an armature may fail to properly respond to the energization of the relay. For example, the polar armature may fail to reverse its position when the energization of the relay is reversed. Such failure may cause signal circuits controlled through contacts of the relay to function improperly.

Accordingly, a feature of my invention is the provision of improved electrical control apparatus to effect different control functions according to the energization of a control circuit.

Another feature of my invention is the provision of electrical control apparatus incorporating novel means to assure a first control function in response to current of normal polarity and a second control function in response to current of reverse polarity, and to effect the second function in the event the apparatus fails to properly respond to current of normal polarity.

Still another feature of my invention is the provision of improved control apparatus for insuring that a controlled device will not function unless the control apparatus assumes a position corresponding to the polarity of the current supplied to a control circuit and if the apparatus does not reverse its position in response to a reversal of the polarity of the current supplied to the control circuit, the control device assumes the position it assumes when the control circuit is deenergized.

Again, a feature of my invention is the provision of control apparatus of the type here involved incorporating novel means to check the position of a polar armature of a polar neutral relay.

Other features, objects and advantages of my invention will appear as the specification progresses.

The foregoing features, objects and advantages of my invention are attained by the provision of two direct current relays and a novel circuit arrangement for energizing the relays from a control circuit which at times is deenergized and to which circuit at other times current is supplied of either positive or negative polarity. For example, the control circuit may be a line circuit of a railway signal system, a battery being connected to one end of the line circuit through contacts of a pole changer type of controller and signal control relays being connected to the other end of the circuit.

A first one of the relays of the control apparatus here provided is preferably of a direct current polar neutral or polarized type, but other types of relays can be used. This first relay is provided with a neutral armature which is biased to a first or released position when the relay is deenergized and is attracted to a second or picked up position when the relay is energized at either polarity. Also, this first relay is preferably provided with a polar armature which is operated to a normal or a reverse position according as the relay is energized at normal or reverse polarity. The relay is connected to the control circuit to be energized at a polarity corresponding to the polarity of the current supplied to the circuit and to become deenergized when the circuit is deenergized.

A second one of the control relays of the control apparatus is preferably a direct current neutral relay which is provided with a pick-up and a stick circuit. The pick-up circuit includes a back contact of the first relay and a current source local to the location of the control apparatus. That is, this local source is ordinarily independent of the current source of the control circuit. The pick-up circuit is poled for the second relay to be energized at a preselected polarity, which by way of illustration I shall assume in the following description to be of positive polarity. The stick circuit for the second relay connects a winding of the relay to the control circuit for energizing the second relay by the control circuit current subsequent to the energization of the first relay to disconnect the local current source. In certain forms of the invention the stick circuit includes polar contacts of the first relay to pole change the connection to the control circuit in such a manner that the second relay is energized at its preselected polarity if the position of the polar armature of the first relay corresponds to the polarity of the control circuit. Otherwise the energization of the second relay would be reversed and such reversal would cause the relay to be released as the energization of the relay tends to pass through zero. The second relay once thus released it would remain deenergized due to the opening of its front contact interposed in its stick circuit until the first relay is again released to reclose the pick-up circuit. The second relay jointly with the first relay is used to control signal circuits and consequently the proper control of such signal circuits is effected only when the second relay is picked up and this is accomplished only if the positions of the armatures of the first relay correspond to the condition of the control circuit.

In other forms of the invention the stick circuit for the second relay does not include polar contacts of the first relay and the second relay is retained energized subsequent to the picking up of a first relay only when the polarity of the control circuit current is such that the energization of the second relay by the control circuit current is the same as the preselected polarity at which the second relay is energized by the local current source. When the polarity of the control circuit is reversed from the preselected polarity, then the second relay is released. In this way the second relay by its position reflects the polarity of the line circuit current and in cooperation with the main relay assures that a first control function is effected when the control circuit current is of positive polarity and a second function is effected when the control circuit current is of negative polarity.

I shall describe several forms of apparatus embodying my invention, and shall then point out the novel features thereof in claims.

Figure 2:
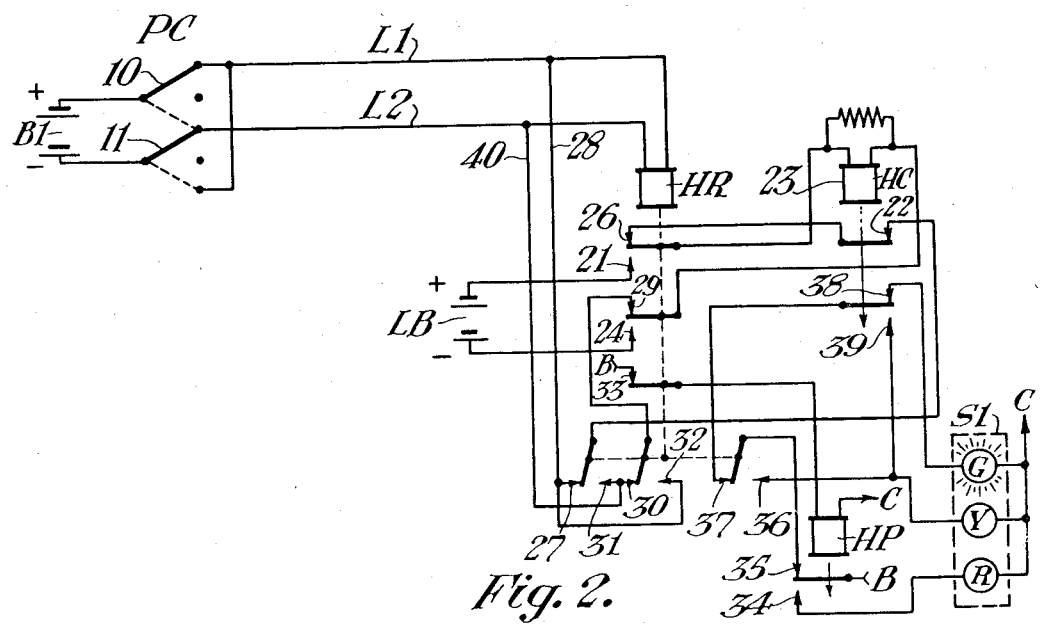
Figure 3:
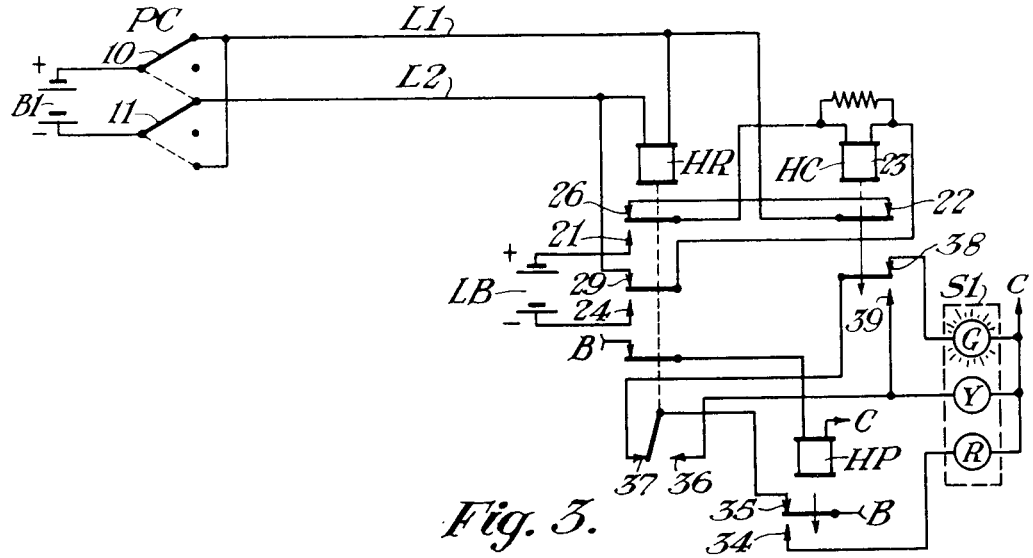
Figure 4:
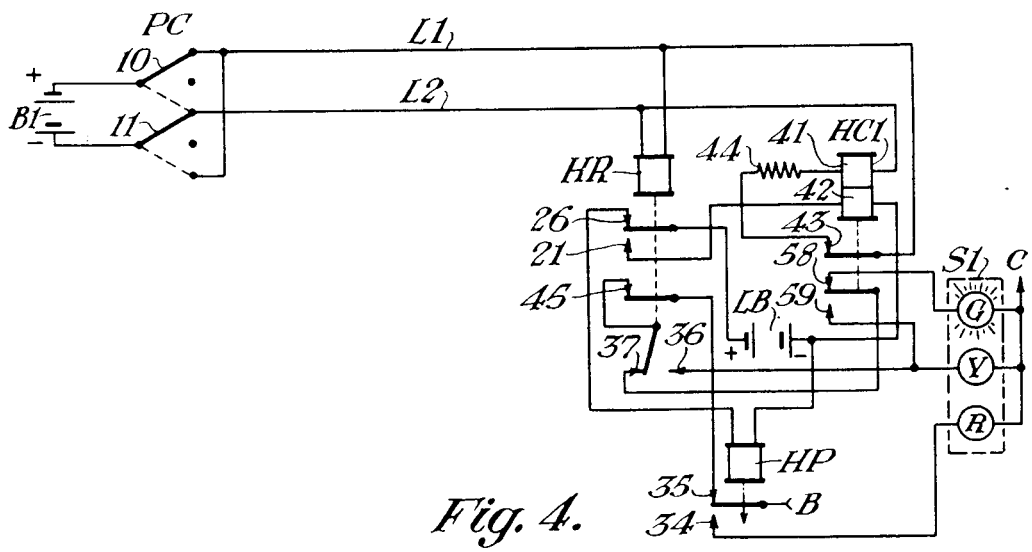
Figure 5:
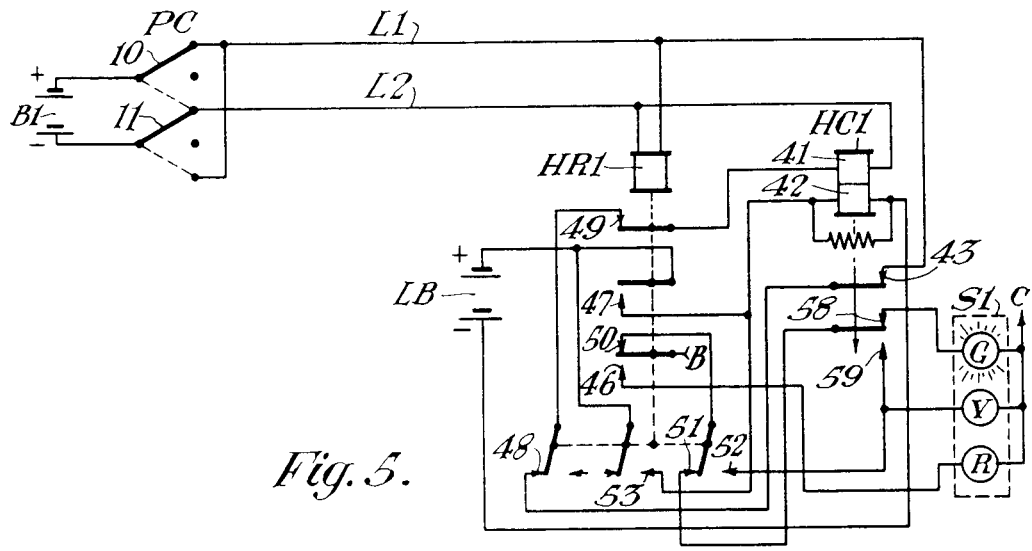
Figure 6:
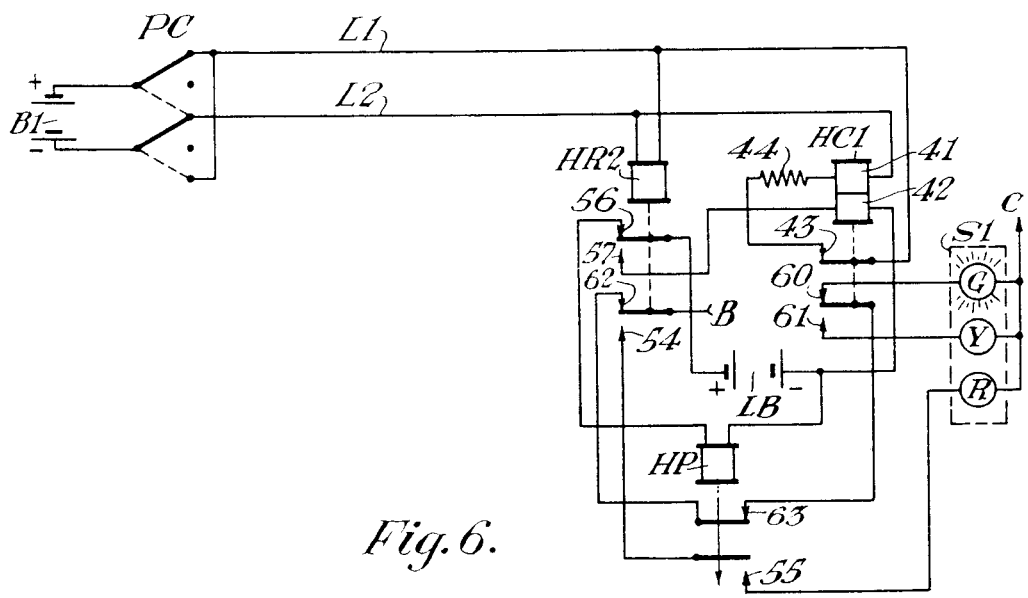

In the accompanying drawings, Fig. 1 is a diagrammatic view showing a form of apparatus embodying my invention when used to control a railway signal, and in which form of apparatus the auxiliary or second relay is manually reset and the position of the polar armature of the main or first relay is checked. Fig. 2 is a diagrammatic view showing a form of apparatus embodying my invention when used to control a railway signal and in which form of apparatus automatic resetting of an auxiliary or second relay and a check of the position of a polar armature of a first relay are provided. Fig. 3 is a diagrammatic view showing another form of apparatus embodying my invention when used to govern a railway signal and in which form of apparatus the automatic setting of the second relay is provided but the stick circuit of the second relay does not include polar contacts of the first relay. Fig. 4 is a diagrammatic view showing a modification of the apparatus of Fig. 3, and which form of apparatus also embodies my invention. Fig. 5 is a diagrammatic view showing a modification of the apparatus of Fig. 2 using a polar neutral relay of the retained neutral type and which form of apparatus also embodies the invention. Fig. 6 is a diagrammatic view showing a form of apparatus embodying my invention when used to control a railway signal and in which form of apparatus only neutral relays are used.

In each of the several views like reference characters are used to designate similar parts.

It is to be understood that the invention is not limited to the control of a railway signal and this one use serves to illustrate the many places the apparatus is useful.

Referring to Fig. 1, the reference characters L1 and L2 designate the two conductors of a control circuit here shown in the form of a line circuit for a railway signal system, and which circuit extends between two signal locations along the railway. At a first location this line circuit is connected to a source of direct current, such as a battery B1, through contact members 10 and 11 of a pole changer type of controller PC. The arrangement is such that direct current of what I shall call positive polarity is supplied from battery B1 to the line circuit when the controller PC is moved to a first extreme position where its contact members 10 and 11 occupy the position shown by the solid lines in the drawing, and current of negative polarity is supplied to the line circuit when the controller is set at a second extreme position and contact members 10 and 11 occupy the position shown by dotted lines. Furthermore, the controller PC is preferably operable to a mid position where the battery B1 is disconnected and the line circuit is deenergized.

At the second location the line circuit is connected to control apparatus which includes a first or main relay HR and a second or auxiliary relay HC. The main relay HR is a direct current polar neutral relay, a winding 12 of the relay being connected to conductors L1 and L2 of the line circuit through a front contact 13 of the auxiliary relay HC, front contact 13 being interposed in this connection for reasons to be more fully explained hereinafter. Consequently, with front contact 13 of relay HC closed, the relay HR is energized to pick up a neutral armature to which contact members 14, 15 and 16 are attached to close front contacts 26, 29 and 33, respectively, when the line circuit is supplied with current of either polarity and this armature is released to close back contacts 21 and 24 when the line circuit is deenergized or the front contact 13 is open. Also, a polar armature to which contact members 17, 18 and 19 are attached, is operated to a position corresponding to the polarity of the current supplied to the relay HR. I shall assume by way of illustration that the relay HR is energized at positive polarity when the line circuit current is of positive polarity and the polar armature is operated to a left-hand position as viewed in Fig. 1 to close normal polar contacts 27, 30 and 37. When the relay HR is energized at negative polarity the polar armature is operated to the right-hand position to close reverse polar contacts 31, 32 and 36.

The auxiliary relay HC is a direct current neutral relay and is provided with a pick-up or a restoring circuit supplied with current from battery LB which is preferably placed at the same location as the control relays. This pick-up circuit can be traced from positive terminal of battery LB through back contact 21 of relay HR, a normally open contact 25 of a manually operable push button PB, winding 23 of relay HC and back contact 24 of relay HR to negative terminal of battery LB. When relay HR is released to close back contacts 21 and 24 the relay HC can be energized from battery LB by manual operation of the push button PB to close contact 25, the relay HC being energized at a polarity preselected by the connection, and I shall assume that relay HC is energized at positive polarity when connected to the battery LB. Relay HC is also provided with a stick circuit for connecting a winding of the relay to the line circuit for energizing the relay by the line circuit current. One side of such stick circuit can be traced from the left-hand terminal of winding 23 of relay HC through front contact 22 of the relay, front contact 26 of relay HR, normal polar contact 27 of relay HR, wire 28 and front contact 13 of relay HC to conductor L1. The other side of such stick circuit extends from the right-hand terminal of winding 23, through front contact 29 and normal polar contact 30 of relay HR and wire 40 to line conductor L2. When the first relay HR is energized at negative polarity and the polar armature is reversed to the right-hand position, the reverse polar contacts 31 and 32 serve to pole change this stick circuit for relay HC in the usual manner. The connections are such that relay HC is energized at positive polarity, that is, the same polarity as the relay is energized through the pickup circuit, by the line circuit current and thus with relay HC once energized by current from the local battery LB the relay is retained energized by the line circuit current subsequent to the picking up of the first relay HR, the relay HC being provided with slow release characteristics to retain the relay picked up during the transfer period of the contacts of the relay HR.

The apparatus also includes a slow release repeater relay HP for the relay HR and which repeater relay is energized through an obvious circuit including front contact 33 of relay HR.

The control relays jointly control a railway signal S1, here shown in the form of a color light signal.

In describing the operation of the apparatus of Fig. 1, I shall first assume that the line circuit is deenergized due to the controller PC being set at its mid position to disconnect battery B1. With the line circuit deenergized the main relay HR and in turn its repeater relay HP are deenergized, and with the repeater relay HP deenergized closing back contact 34, a signal circuit is completed for a lamp R of the signal S1 and current is supplied from a suitable source the terminals of which are designated B and C, to the lamp R to illuminate the lamp for the signal to display a stop signal indication.

I shall next assume that when relay HR is released the push button PB is operated to close contact 25 so that the auxiliary relay HC is energized by current supplied from the local battery LB. If now the controller PC is set at its first extreme position where the contact members 10 and 11 occupy the full line position and current of positive polarity is supplied to the line circuit, the main relay HR is energized at positive polarity to pick up its neutral armature and to operate its polar armature to the left-hand position. With relay HR thus energized, the auxiliary relay HC is switched from battery LB to the line circuit and the relay HC is retained energized by the line circuit current. The relay HP is also picked up due to the picking up of the main relay HR. Under this condition of the control relays a signal circuit extends from terminal B through front contact 35 of relay HP, normal polar contact 31 of relay HR, front contact 38 of relay HC and lamp G to terminal C, and the lamp G is illuminated for signal S1 to display a clear signal indication. That is to say, the signal S1 displays a clear signal indication in response to line circuit current of positive polarity. In the event the polar armature of relay HR fails to move to the left-hand position in response to current of positive polarity, the current supplied from the line circuit to the relay HC is of reverse polarity and such reversal of the energization of relay HC would cause the relay to be released when the energization tends to pass through zero. The release of relay HC to open front contacts 13 and 22 deenergizes both relays HR and HC and with relay HR deenergized the repeater relay HP is released and consequently the lamp R is illuminated by current supplied through the back contact 34 of relay HP. That is, the signal S1 displays the stop indication due to the failure of the operation of the polar armature of the relay HR.

In the event the controller PC is moved to its second extreme position, that is, to the dotted line position, and current of negative polarity is supplied to the line circuit subsequent to the picking up of the auxiliary relay HC through the local pick-up circuit, the relay HR is energized at negative polarity to pick up its neutral armature and to operate its polar armature to its right-hand position. The stick circuit for the auxiliary relay HC is closed at the reverse polar contacts of relay HR and relay HC is retained energized by the line circuit current. A signal circuit is now formed from terminal B through front contact 35 of the repeater relay HP, reverse polar contact 36 of relay HR and lamp Y to terminal C, and lamp Y is illuminated for signal S1 to display an approach signal indication. That is, signal S1 is made to display an approach signal indication in response to current of negative polarity supplied to the line circuit. In the event the polar armature of the relay HR fails to reverse to the right-hand position, the auxiliary relay HC is supplied with current of reverse polarity and such reversal in its energization causes it to be released to open front contact 13, with the result the main relay HR and in turn the repeater relay HP are deenergized and the stop signal lamp R is illuminated to display a stop signal indication due to such failure in the operation of the control apparatus.

In some cases it may be desirable to provide only an approach signal indication when the polar armature of relay HR fails to operate, and in such cases the front contact 13 of relay HC would be eliminated. With such changes in the construction of the apparatus of Fig. 1 and the polar armature of relay HR fails to properly reverse in response to a change in the polarity of the line circuit current, the auxiliary relay HC will be deenergized and released, the same as before, but the main relay HR and its repeater relay HP will remain energized. In the case the polar armature fails at the left-hand position, that is the normal position, then a circuit is formed for the lamp Y through front contact 35 of relay HP, normal polar contact 37 of relay HR, back contact 39 of relay HC and lamp Y, and lamp Y is illuminated to display the more restrictive approach indication in place of the display of the clear indication. In the case the polar armature fails at the right-hand position, then the circuit for the lamp Y is completed through the reverse polar contact 36 of relay HR to display the approach signal indication.

It is also to be pointed out in connection with the apparatus of Fig. 1 that the polar contacts 27 and 31 of relay HR can be replaced by asymmetrical units, such as half wave rectifier elements, and when the apparatus is thus modified the apparatus will function in substantially the same manner as described above. This modification would be helpful in case the main relay HR is one provided with only two polar contact members.

Furthermore, it is apparent that the contact 25 in the pick-up circuit for the auxiliary relay HC may be a contact governed by some device of the railway signal system rather than by a manually operable push button.

Referring to Fig. 2, the control apparatus is different from that of Fig. 1 in that the manually operable contact 25, is removed and the auxiliary relay HC is self restoring. It is thought that the apparatus of Fig. 2 can best be understood from a description of its operation.

At the start I shall assume that the pole changer PC of Fig. 2 is set at its mid position so that the line circuit is deenergized. With the line circuit deenergized the main relay HR and in turn its repeater relay HP are deenergized and with relay HP deenergized closing back contact 34 the circuit for the lamp R is closed and that lamp is illuminated for signal S1 to display its stop indication. When relay HR releases closing back contacts 21 and 24, the local battery LB is connected to winding 23 of the auxiliary relay HC and that relay is energized, the connection being such that the relay is energized at positive polarity. Assuming next that the controller PC is moved to its first extreme position and current of positive polarity is supplied to the line circuit, the relay HR is energized to pick up its neutral armature and to operate its polar armature to the left-hand position. With relay HR picked up, the auxiliary relay HC is connected to the line circuit through a stick circuit one side of which extends from the left-hand terminal of winding 23 through front contacts 26 and 22 of relays HR and HC, respectively, normal polar contact 27 of relay HR and wire 28 to line connector L1, and the other side of which stick circuit extends from the right-hand terminal of winding 23 through front contact 29 and normal polar contact 30 of relay HR and wire 40 to the line conductor L2. As explained in connection with Fig. 1, the polar contacts 27 and 30 pole change the connection of this stick circuit so that the relay HC is energized at positive polarity and is retained picked up subsequent to the picking up of the relay HR. Repeater relay HP is energized in response to the closing of front contact 33 of relay HR and the signal circuit is formed from terminal B through front contact 35 of relay HP, normal polar contact 37 of relay HR, front contact 38 of relay HC and lamp G to terminal C, and lamp G is illuminated for signal S1 to display a clear signal indication. Assuming that the polar armature of the relay HR fails to move to the left-hand position in response to current of positive polarity supplied to the line circuit, the relay HC is supplied with current through reverse polar contacts 31 and 32 and the energization of the auxiliary relay HC is reversed with the result that the relay will be released when its energization tends to pass through zero and once released to open its stick circuit at front contact 22 it remains released. There is now provided a circuit for the lamp Y of signal S1 through the front contact 35 of relay HP, reverse polar contact 36 of relay HR, and the lamp Y is illuminated to display the more restrictive indication due to the improper operation of the relay HR.

Assuming next that the controller PC is shifted to its second extreme position and current of negative polarity is supplied to the line circuit, the energization of the relay HR is reversed causing that relay to first release its neutral armature and then shift its polar armature and pick up its neutral armature. During the interval the neutral armature is released, the auxiliary relay HC is provided with an energizing impulse from the local battery LB and with relay HR operated to its right-hand position the stick circuit for relay HC is pole changed at contacts 31 and 32 and relay HC is retained energized by the line circuit current. With the polar armature of relay HR operated to the right-hand position in response to current of negative polarity, a circuit is formed for the lamp Y through front contact 35 of relay HP and reverse polar contact 36 of relay HR and the lamp Y is illuminated to display an approach signal indication. In the event the polar armature of relay HR fails to reverse to the right-hand position, then the energization of relay HC from the line circuit is such that the relay is caused to be released and as a result the alternative circuit extending from terminal B through front contact 35 of relay HP, normal polar contact 37 of relay HR and back contact 39 of relay HC and the lamp Y is closed and lamp Y is illuminated for signal S1 to display an approach indication.

In Fig. 3, the control apparatus is different from that of Fig. 2 in that no polar contacts of relay HR are included in the stick circuit for the auxiliary relay HC. In the event the line circuit of Fig. 3 is deenergized, the main relay HR and its repeater relay HP are deenergized, and with the closing of back contact 34 of relay HP the circuit for lamp R is completed and signal S1 displays a stop signal indication. When relay HR is released to close back contact 21 and 24, the local battery LB is connected to winding 23 of the auxiliary relay HC and that relay is energized, the connection being such that the relay is energized at positive polarity, the same as in the previous cases. Assuming that the controller PC is operated to its first extreme position and current of positive polarity is supplied to the line circuit, the main relay HR is energized at positive polarity to pick up its neutral armature and to operate its polar armature to the left-hand position. The auxiliary relay HC is now connected to the line circuit through a stick circuit, and current flows from line conductor L1 through front contact 22 of relay HC, front contact 26 of relay HR, winding 23 of relay HC and front contact 29 of relay HR to line conductor L2, and the relay HC is energized. The connections are such that relay HC is energized at positive polarity, and is retained picked up subsequent to the picking up of the main relay HR.

Under this condition of the control relays the signal circuit is formed from terminal B through front contact 35 of relay HP, normal polar contact 37 of relay HR, front contact 38 of relay HP and lamp G of signal S1 to terminal C, and the lamp G is illuminated for signal S1 to display a clear signal indication in response to line circuit current of positive polarity. In the event the polar armature of relay HR fails to operate to its left-hand position in response to current of positive polarity, the circuit for lamp Y of signal S1 is completed at the reverse polar contact 36 of relay HR and the signal S1 displays its more restrictive approach indication.

In the case the controller PC is operated to its second extreme position and current of negative polarity is supplied to the line circuit, the relay HR is energized at negative polarity and its polar armature operated to its right-hand position, to close the circuit for lamp Y at the reverse polar contact 36 and the signal S1 displays an approach signal indication in response to line circuit current of negative polarity. The auxiliary relay HC when connected to the line circuit is energized at negative polarity and since this is a reversal in its energization from that supplied by the local battery LB the auxiliary relay HC is released and once released it remains released due to the opening of its stick circuit at front contact 22. In the event the polar armature of relay HR fails to operate to its right-hand position in response to the line circuit current of negative polarity the alternative circuit path for lamp Y is formed through normal polar contact 37 of relay HR and back contact 39 of relay HC and the signal S1 displays the proper approach signal indication, regardless of the failure of the polar armature of relay HR to reverse its position.

In Fig. 4, the control apparatus includes an auxiliary relay HC1 of the two-winding type, winding 41 being a holding winding and winding 42 being a pick-up winding.

Assuming the line circuit of Fig. 4 is deenergized, the main relay HR and its repeater relay HP are deenergized and the signal circuit for lamp R is closed at back contact 34 of relay HP and signal S1 displays a stop signal indication. When relay HR is released current flows from positive terminal of the local battery LB through back contact 21 of relay HR and pick-up winding 42 of relay HC1 to negative terminal of battery LB and the auxiliary relay HC1 is energized and picked up, the connection being such that the relay is energized at positive polarity. The closing of front contact 43 of relay HC1 connects the holding winding 41 across the line conductors L1 and L2, a resistor 44 being preferably included in the connection.

Assuming that the controller PC of Fig. 4 is moved to its first extreme position and current of positive polarity is supplied to the line circuit, the main relay HR is energized at positive polarity to pick up its neutral armature and to operate its polar armature to the left-hand position. Also the holding winding 41 of relay HC1 is supplied with current from the line circuit and relay HC1 is energized from the line circuit current, the connection being such that the relay is energized at positive polarity and consequently the relay HC1 is retained energized by the line circuit current. Under this condition of the control relays, a signal circuit is formed from terminal B through front contact 35 of relay HP, front contact 45 and normal polar contact 37 of relay HR, front contact 58 of relay HC1 and lamp G to terminal C, and the signal S1 displays a clear signal indication in response to line circuit current of positive polarity. In the event the polar armature of relay HR fails to operate to the left-hand position, the circuit for lamp Y of the signal S1 is completed through front contact 35 of relay HP, front contact 45 and reverse polar contact 36 of relay HR and the signal displays the more restrictive approach indication due to the failure of proper operation of the relay HR.

Assuming next that the controller PC is operated to its second extreme position and current of negative polarity is supplied to the line circuit, the relay HR is energized at negative polarity to pick up its neutral armature and to operate its polar armature to the right-hand position. The closing of front contact 45 and reverse polar contact 36 of relay HR completes the circuit for lamp Y and an approach signal indication is displayed in response to line circuit current of negative polarity. The energization of holding winding 41 of the auxiliary relay HC1 is reversed from that provided by the local battery LB and the auxiliary relay HC1 is released and will remain released due to the opening of the front contact 43 of the relay. In the event the polar armature of relay HR fails to reverse to the right-hand position, an alternative circuit for lamp Y through the normal polar contact 37 of relay HR and back contact 59 of relay HC is closed and an approach signal indication is displayed notwithstanding a failure in the proper operation of the relay HR.

In Fig. 5, the main relay of the control apparatus is a polar neutral relay HR1 of the retained neutral type, that is, the neutral armature of the relay is retained picked up during a reversal of the energizing current. Also the repeater relay HP is omitted.

With the line circuit of Fig. 5 deenergized, the main relay HR1 is released closing back contact 46 to complete a signal circuit for lamp R of signal S1 and the signal displays a stop signal indication. When relay HR1 is released to close back contact 47, current flows from the local battery LB through pick-up winding 42 of relay HC1 and that relay is energized and picked up, the connection being such that the relay is energized at positive polarity. Assuming that the controller PC is set at its first extreme position and the line circuit is supplied with current of positive polarity, the main relay HR1 is energized at positive polarity to pick up its neutral armature and operate its polar armature to the left-hand position. The holding winding 41 of the auxiliary relay HC1 is now connected to the line circuit, the connection extending from line conductor L1 through front contact 43 of relay HC1, normal polar contact 48 and front contact 49 of relay HR1 and holding winding 41 to the line conductor L2. The connection of this circuit is such that relay HC1 is energized at positive polarity in response to line circuit current of positive polarity and the relay HC1 is retained energized subsequent to the picking up of relay HR1. A signal circuit is now formed from terminal B through front contact 50 and normal polar contact 51 of relay HR1, front contact 58 of relay HC1 and lamp G to terminal C, the signal S1 displays a clear signal indication. In the event the polar armature of relay HR1 fails to move to the left-hand position, a circuit for lamp Y is formed through front contact 50 and reverse polar contact 52 of relay HR1, and the signal S1 displays the more restrictive approach indication due to the failure in the operation of relay HR1.

Assuming that the controller PC is moved to its second extreme position and current of negative polarity is supplied to the line circuit, the energization of relay HR1 is reversed to reverse its polar armature to the right-hand position, the neutral armature being retained picked up during such reversal in the energization of the relay because of the characteristic of the relay. The circuit for holding winding 41 is now open at polar contact 48 of relay HR1 but relay HC1 is energized due to pick-up winding 42 receiving current through polar contact 53 of relay HR1. Under this energization of the main relay HR1 the signal circuit for the lamp Y is completed at front contact 50 and reverse polar contact 52 of relay HR1 and the signal displays an approach signal indication. In the case the polar armature of relay HR1 fails to reverse, the connection of holding winding 41 to the line circuit will be retained but the relay HC1 will be energized at negative polarity due to the polarity of the line circuit current and the relay HC1 will be released and once released it will remain released due to the opening of its front contact 43. The circuit for lamp Y is now completed through front contact 50 and normal polar contact 51 of relay HR1 and the back contact 59 of relay HC1 and the signal displays the proper approach signal indication in response to line circuit current of negative polarity. It is to be pointed out that in Fig. 5 an alternative circuit for the pick-up winding 42 of the auxiliary relay HC1 is completed at the reverse polar contact 53 of relay HR1 to restore the relay HC1 when the line circuit current has been reversed to negative polarity and relay HR1 is operated thereby.

Referring to Fig. 6, the main relay of the control apparatus is a direct current neutral relay HR2 and a slow release repeater relay HP is used, the relay HP being energized from local battery LB through front contact 56 of relay HR2.

When the line circuit of Fig. 6 is deenergized the relay HR2, and in turn the repeater relay HP are deenergized and under these circumstances a signal circuit is formed for lamp R through back contact 54 of relay HR2 and back contact 55 of relay HP and the signal S1 displays a stop signal indication.

When the main relay HR2 is released, the pick-up winding 42 of the auxiliary relay HC1 is energized by the local battery LB through back contact 57 of relay HR2, relay HC1 being energized at positive polarity. Assuming now that the controller PC is set at its first extreme position for current of positive polarity to be supplied to the line circuit, the main relay HR2 is energized and picked up and in turn its repeater relay is energized. Current is now supplied from the line circuit to holding winding 41 of the auxiliary relay HC1 through front contact 43 of the relay and resistor 44. The connections are such that relay HC1 is energized at positive polarity and hence is retained picked up in response to line circuit current of positive polarity. With all three relays HR2, HC1 and HP picked up, current flows from terminal B through front contact 62 of relay HR2, front contact 63 of relay HP, front contact 60 of relay HC1 and lamp G to terminal C, and lamp G is illuminated for signal S1 to display a clear signal indication in response to line circuit current of positive polarity. In the event the controller PC is operated to its second extreme position and current of negative polarity is supplied to the line circuit the relay HR2 and in turn relay HP are energized and picked up. The energization of holding winding 41 of relay HC1, however, is now reversed and as the energization tends to pass through zero the relay is released and then remains released due to the opening of front contact 43. A signal circuit is now formed through front contact 62 of relay HR2, front contact 63 of relay HP, back contact 61 of relay HC1 and lamp Y, and that lamp is illuminated for signal S1 to display an approach signal indication in response to line circuit current of negative polarity.

Apparatus such as here disclosed has the advantages that a first function is effected in response to current of one polarity and a second function is effected in response to current of the opposite polarity in a safe and reliable manner. Also, the position of the polar armature of a polar neutral relay is checked and either a more restrictive control is provided or the proper control is provided by an alternative circuit in response to the failure in the movement of the polar armature. Again, the apparatus is comparatively simple and inexpensive and can be applied to present systems to provide these additional safety features.

Although I have herein shown and described several forms of electrical control apparatus embodying my invention, it is understood that various changes and modifications may be made therein within the scope of the appended claims without departing from the spirit and scope of my invention.

Having thus described my invention, what I claim is:

1. In combination, a control circuit connected to a current source to be supplied with direct current of either positive or negative polarity according as a controller is set at either a first or a second position, a main relay provided with a neutral armature and having a winding connected to said control circut for energization of the relay by said control circuit current, an auxiliary relay, a pick-up circuit including a back contact of said neutral armature of said main relay and a current source connected to said auxiliary relay to energize that relay at a preselected polarity, a stick circuit including a front contact of said auxiliary relay to connect the auxiliary relay to said control circuit to energize the auxiliary relay by the line circuit current to retain the auxiliary relay energized subsequent to the energizing of the main relay when the control circuit current is of a polarity to energize the auxiliary relay at said preselected polarity, and a controlled device governed jointly by said relays.

2. In combination, a control circuit connected to a current source to be supplied with direct current of either positive or negative polarity according as a controller is set at either a first or a second position, a main relay provided with a neutral armature and having a winding connected to said control circuit for energization of that relay by said control circuit current, an auxiliary relay, a pick-up circuit including a back contact of said neutral armature of said main relay and a direct current source independent of the first mentioned current source connected to said auxiliary relay to energize that relay at a polarity preselected by the connection of the pick-up circuit, a stick circuit including a front contact of the auxiliary relay to connect the auxiliary relay to said control circuit to energize the auxiliary relay by said control circuit current, said auxiliary relay being retained energized when the control circuit current is of a polarity to energize the auxiliary relay at the same polarity as that effected by said pick-up circuit, and a signal circuit controlled by a front contact of each of said relays.

3. In combination, a control circuit connected to a current source to be supplied with direct current of either positive or negative polarity according as a controller is set at either a first or a second position, and control apparatus including a first and a second relay receiving current from said control circuit to effect either a first or a second function according as such current is either positive or negative in polarity, said first relay having a neutral armature which is attracted when the relay is energized by current of either polarity and said second relay provided with a pick-up circuit including a local current source and a contact governed by said neutral armature and closed when the first relay is deenergized and with a stick circuit including its own front contact to connect a winding of the relay across said control circuit.

4. In combination, a control circuit connected to a current source to be supplied with direct current of either positive or negative polarity according as a controller is set at either a first or a second position, a polar neutral relay provided with neutral and polar contacts and having a winding connected to said control circuit to reversibly energize the relay by said direct current, a neutral relay, a pick-up circuit including a back neutral contact of said polar neutral relay and a current source connected to a winding of said neutral relay to energize that relay at a preselected polarity, a stick circuit including a front contact of the neutral relay to connect said winding of the neutral relay to said control circuit to energize the neutral relay by the control circuit current, polar contacts of said polar neutral relay interposed in said stick circuit to pole change the stick circuit to energize said neutral relay at said preselected polarity by the control circuit current only when the position of the polar armature of the polar neutral relay is in agreement with the polarity of the control circuit current, a first signal circuit controlled by a front contact of each of said relays, and a second signal circuit controlled by a front contact of the polar neutral relay and a back contact of the neutral relay.

5. In combination, a control circuit reversibly supplied with direct current through a pole changer, a first and a second relay, said first relay being a polar neutral relay provided with a neutral and a polar armature and having a winding connected to said control circuit for reversibly energizing the relay by the control circuit current, said second relay being a neutral relay provided with a pick-up and a stick circuit, said pick-up circuit including a back neutral contact of said first relay and a local direct current source poled to energize the second relay at a preselected polarity, said stick circuit connecting a winding of the second relay to said control circuit and including a front contact of the second relay and pole changing polar contacts of the first relay to energize the second relay at said preselected polarity by the control circuit current when the position of the polar armature of the first relay is in agreement with the polarity of the control circuit current whereby said second relay is retained energized or is released according as the first relay properly responds or fails to properly respond to the polarity of the control circuit current, and signal circuits selectively controlled through polar contacts of the first relay and contacts of the second relay.

6. In combination, a control circuit reversibly supplied with direct current through a pole changer, a polar neutral relay, a neutral relay, a first circuit connection to connect a winding of said polar neutral relay to said control circuit to reversibly energize that relay by such direct current, a pick-up circuit including a direct current source and a back neutral contact of said polar neutral relay to energize the neutral relay at a preselected polarity, a stick circuit including a front contact of the neutral relay to connect a winding of that relay to said control circuit to energize the neutral relay by the control circuit current subsequent to the picking up of the polar neutral relay, polar contacts of the polar neutral relay interposed in said stick circuit to effect energization of the neutral relay at said preselected polarity by said control circuit current only when the position of the polar armature of the polar neutral relay is in agreement with the polarity of the control circuit current, and a front contact of the neutral relay interposed in said first circuit connection to deenergize said polar neutral relay when the position of the polar armature of the polar neutral relay is in disagreement with the polarity of the control circuit current.

7. In combination, a control circuit reversibly supplied with direct current through a pole changer, a polar neutral relay, a neutral relay, a first circuit connection to connect a winding of said polar neutral relay to said control circuit to reversibly energize that relay by such direct current; a pick-up circuit including a local direct current source, a back neutral contact of said polar neutral relay and another contact connected to a winding of said neutral relay to energize the neutral relay at a preselected polarity; said another contact normally open and adapted to be closed at times independent of said control circuit, a stick circuit including polar contacts of said polar neutral relay and a front contact of said neutral relay to connect a winding of the neutral relay to the control circuit, said polar contacts to pole change said stick circuit to energize said neutral relay at said preselected polarity and retain the neutral relay picked up when the position of the polar neutral relay is in agreement with the polarity of the control circuit current and to deenergize the neutral relay when the position of the polar neutral relay is in disagreement with the polarity of the control circuit current, and signal circuits selectively controlled by said relays.

8. In combination, a line circuit extending between a first and a second location, means including a direct current source and a three position controller at said first location connected to said line circuit to supply current of normal or reverse polarity or to deenergize the line circuit according to a first, a second or a third position of the controller; a polar neutral relay at said second location connected to said line circuit to energize the relay at normal or reverse polarity or deenergize the relay according to the position of said controller, a neutral relay and a direct current source at said second location, a pick-up circuit including a back neutral contact of said polar neutral relay and said second location current source connected to said neutral relay to energize the neutral relay at normal polarity, a stick circuit including a front contact of said neutral relay to connect that relay to said line circuit to energize the neutral relay by line circuit current subsequent to the picking up of the polar neutral relay, said neutral relay being retained picked up when the line circuit current is of normal polarity and being released when the line circuit current is of reverse polarity, a first signal circuit controlled through front neutral contacts of each of said relays and a normal polar contact of the polar neutral relay, a second signal circuit controlled through a front neutral contact of the polar neutral relay and two alternative paths one through a normal polar contact of the polar neutral relay and a back contact of the neutral relay and the other path through a reverse polar contact of the polar neutral relay, and a third signal circuit energized when the polar neutral relay is deenergized.

9. In combination, a line circuit extending between a first and a second location, means including a direct current source and a controller operable to a first and a second position at said first location connected to the line circuit to supply current of either positive or negative polarity according as the controller is set at its first or second position, a polar neutral relay at said second location receiving current from the line circuit to energize that relay at positive or negative polarity according to the polarity of the line circuit current, a neutral relay, a pick-up circuit including a direct current source at the second location and a back neutral contact of the polar neutral relay and connected to the neutral relay to energize the neutral relay at positive polarity, a stick circuit including a front contact of the neutral relay and a front neutral contact of the polar neutral relay to connect the neutral relay to said line circuit to retain the neutral relay energized or to deenergize the relay according as the line circuit current is of positive or negative polarity, and a first and a second circuit selectively controlled through polar contacts of the polar neutral relay and front and back contacts of the neutral relay.

10. In combination, a control circuit reversibly supplied with direct current according as a controller is set at a first or a second position, a main and an auxiliary relay, said main relay a direct current polar neutral relay having a winding connected to said control circuit to energize the relay at normal or reverse polarity according to the polarity of the control circuit current, said auxiliary relay a two winding neutral relay having a pick-up winding connected to a local direct current source through a back neutral contact of the main relay and a holding winding connected to the control circuit through its own front neutral contact, said pick-up winding disposed to energize the auxiliary relay at normal polarity and said holding winding disposed to energize the auxiliary relay at normal polarity when the control circuit current is of normal polarity whereby the auxiliary relay is retained energized or is deenergized subsequent to the energizing of the main relay according as the control circuit is supplied with current of normal or reverse polarity, and signal circuits selectively controlled through polar contacts of said main relay and front and back contacts of said auxiliary relay.

11. In combination, a control circuit reversibly supplied with direct current according as a controller is set at a first or a second position, a main and an auxiliary relay, said main relay a direct current polar retained neutral relay having a winding connected to said control circuit to energize the relay at normal or reverse polarity according to the polarity of the control circuit current, said auxiliary relay a neutral relay having a pick-up winding connected to a local source of direct current through a back neutral contact of said main relay and a holding winding connected to said control circuit through a front contact of each of said relays and a normal polar contact of the main relay, said pick-up winding wound to energize the auxiliary relay at normal polarity and said holding winding wound to energize the auxiliary relay at said normal polarity only when the control circuit current is of normal polarity to cause the auxiliary relay to be retained energized or to be deenergized according as the control circuit current is of normal or reverse polarity, and signal circuits selectively controlled through front and back contacts of said auxiliary relay.

12. In combination, a control circuit reversibly supplied with direct current according as a controller is set at a first or a second position, a main and an auxiliary relay, said main relay a direct current polar retained neutral relay having a winding connected to said control circuit to energize the relay at normal or reverse polarity according to the polarity of the control circuit current, a pick-up circuit including a local source of direct current and a back contact of said main relay connected to a winding of said auxiliary relay to energize the auxiliary relay at a preselected polarity; a stick circuit including in series a front contact of the auxiliary relay, a normal polar contact and a front neutral contact of said main relay to connect a winding of the auxiliary relay to said control circuit, said stick circuit disposed to energize said auxiliary circuit relay at said preselected polarity only when the control circuit is of normal polarity whereby said auxiliary relay is energized or is deenergized according as the control circuit current is of normal or reverse polarity, a first signal circuit including a front neutral contact and a normal polar contact of the main relay and a front contact of the auxiliary relay, and a second signal circuit having alternative paths one including said front and normal polar contacts of the main relay and a back contact of the auxiliary relay and the other path including said front neutral and a reverse polar contact of the main relay.

ARTHUR E. DODD.